United States Patent
Bernaudin et al.

(10) Patent No.: US 9,058,503 B2
(45) Date of Patent: Jun. 16, 2015

(54) SYSTEMS AND METHODS FOR SECURE STORAGE ON A MOBILE DEVICE

(71) Applicant: SuccessFactors, South San Francisco, CA (US)

(72) Inventors: Ingrid Bernaudin, Palo Alto, CA (US); Mei Yu, Palo Alto, CA (US); Angus Dunn, Fremont, CA (US)

(73) Assignee: SuccessFactors, Inc., So. San Francisco, CA (US)

( * ) Notice: Subject to any disclaimer, the term of this patent is extended or adjusted under 35 U.S.C. 154(b) by 195 days.

(21) Appl. No.: 13/892,048

(22) Filed: May 10, 2013

(65) Prior Publication Data

US 2014/0337638 A1    Nov. 13, 2014

(51) Int. Cl.
    G06F 21/62    (2013.01)

(52) U.S. Cl.
    CPC .......... *G06F 21/6218* (2013.01); *G06F 21/629* (2013.01)

(58) Field of Classification Search
    None
    See application file for complete search history.

(56) References Cited

U.S. PATENT DOCUMENTS

| | | | |
|---|---|---|---|
| 6,947,556 B1 | 9/2005 | Matyas et al. | |
| 7,260,555 B2 | 8/2007 | Rossmann et al. | |
| 7,269,732 B2 | 9/2007 | Kilian-Kehr | |
| 7,272,716 B2 | 9/2007 | Haller et al. | |
| 7,313,812 B2 | 12/2007 | Robinson et al. | |
| 7,406,598 B2 | 7/2008 | Ducharme | |
| 7,509,687 B2 | 3/2009 | Ofek | |
| 7,587,608 B2 | 9/2009 | Haller et al. | |
| 7,930,756 B1 | 4/2011 | Crocker et al. | |
| 7,957,532 B2 | 6/2011 | Chen et al. | |
| 7,975,137 B2 | 7/2011 | Rits | |
| 8,127,366 B2 | 2/2012 | Vainstein et al. | |
| 8,171,300 B2 | 5/2012 | Krulce | |
| 8,176,334 B2 | 5/2012 | Vainstein | |
| 8,555,085 B2 | 10/2013 | Khoury | |
| 2002/0172363 A1 | 11/2002 | Dierks et al. | |
| 2003/0005019 A1 | 1/2003 | Pabla et al. | |
| 2004/0190714 A1 | 9/2004 | Masui et al. | |
| 2009/0150680 A1 | 6/2009 | Buchanan et al. | |
| 2009/0150970 A1 | 6/2009 | Hinds et al. | |
| 2010/0030783 A1 | 2/2010 | Ho et al. | |
| 2010/0325443 A1* | 12/2010 | Mattsson | 713/189 |
| 2010/0332820 A1 | 12/2010 | Matsushima et al. | |
| 2012/0158828 A1 | 6/2012 | Ireland et al. | |
| 2013/0091543 A1* | 4/2013 | Wade et al. | 726/1 |
| 2013/0166920 A1 | 6/2013 | Cousins et al. | |
| 2013/0262397 A1 | 10/2013 | Hebert | |
| 2013/0263212 A1 | 10/2013 | Faltyn et al. | |
| 2013/0283400 A1 | 10/2013 | Schneider et al. | |

* cited by examiner

*Primary Examiner* — Gilberto Barron, Jr.
*Assistant Examiner* — Malcolm Cribbs
(74) *Attorney, Agent, or Firm* — Fountainhead Law Group PC

(57) ABSTRACT

In one embodiment the present invention includes a computer-implemented method for a mobile device. An application security status is detected. When the application security status is active an application passcode is required to access functionality of a mobile application operating on the mobile device. A first encryption of data associated with the mobile application is performed, where the first encryption uses a first encryption key when the application security status is active, and the first encryption uses a second encryption key when the application security status is not active. A mobile device passcode status is detected. When the mobile device passcode status is active a mobile device passcode is required to access functionality of the mobile computing device. A second encryption of the data is performed when the mobile device passcode status is active, where the second encryption uses a third encryption key.

20 Claims, 4 Drawing Sheets

SYSTEMS AND METHODS FOR SECURE STORAGE ON A MOBILE DEVICE

BACKGROUND

The present invention relates to computing and data processing, and in particular, to systems and methods for secure storage on a mobile device.

Computer security is becoming an increasingly import topic. The growth of mobile computing only compounds the challenge of maintaining the security of both server based and mobile systems. Advancements in processing, communication, and packaging technologies allow every increasing amounts of information to be received, stored, and processed on a variety of mobile devices such as mobile phones or tablet computers. As the computing and storage power of these devices grows, ever increasing amounts of sensitive data are being put at risk.

Companies, for example, may have employees connecting to backend systems and retrieving and storing sensitive data on their mobile devices. As applications on the mobile devices increase in sophistication and functionality, such devices are becoming ubiquitous and indispensable to the conduct of business. However, it is becoming increasingly import to ensure that the data associated with applications running on a mobile device remains secure.

The present disclosure addresses these concerns with techniques to improve data security on a mobile device

SUMMARY

Embodiments of the present invention improve security on mobile devices. In one embodiment, the present invention includes a computer-implemented method comprising detecting, on a mobile computing device, an application security status, wherein when the application security status is active an application passcode is required to access functionality of a mobile application operating on the mobile computing device, performing, on the mobile computing device, a first encryption of data associated with the mobile application, wherein the first encryption uses a first encryption key when the application security status is active, and wherein the first encryption uses a second encryption key when the application security status is not active, detecting, on the mobile computing device, a mobile device passcode status, wherein when the mobile device passcode status is active a mobile device passcode is required to access functionality of the mobile computing device, and performing, on the mobile computing device, a second encryption of the data when the mobile device passcode status is active, wherein the second encryption uses a third encryption key.

In one embodiment, the first encryption key is derived from the application passcode.

In one embodiment, the second encryption key is a randomly generated key produced by the mobile application.

In one embodiment, the third encryption key is derived from the mobile passcode.

In one embodiment, the method further comprises storing the encrypted data in a storage location that is accessible only by the mobile application.

In one embodiment, the first encryption produces encrypted data and the second encryption encrypts the encrypted data.

In one embodiment, the mobile application stores a plurality of data in a storage system accessible only by the mobile application, and the first encryption is performed on a predefined subset of the plurality of data in the storage system, and the second encryption is performed on the plurality of data in the storage system.

In one embodiment, the method further comprises sending, by the mobile application, a request for data to a remote server, receiving, by the mobile application, requested data, performing, by the mobile application, an instruction to store the requested data with a flag indicating the requested data is to be encrypted, and automatically encrypting and storing the requested data in response to the instruction.

In another embodiment, the present disclosure includes a mobile computing device comprising a processor and a non-transitory computer readable medium having stored thereon one or more programs, which when executed by the processor, causes the processor to perform secure data storage as set forth herein.

In another embodiment, the present disclosure includes a non-transitory computer readable storage medium storing one or more programs, the one or more programs comprising instructions for performing a method as set forth herein.

The following detailed description and accompanying drawings provide a better understanding of the nature and advantages of the present invention.

DETAILED DESCRIPTION

Described herein are techniques for secure storage on a mobile device. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
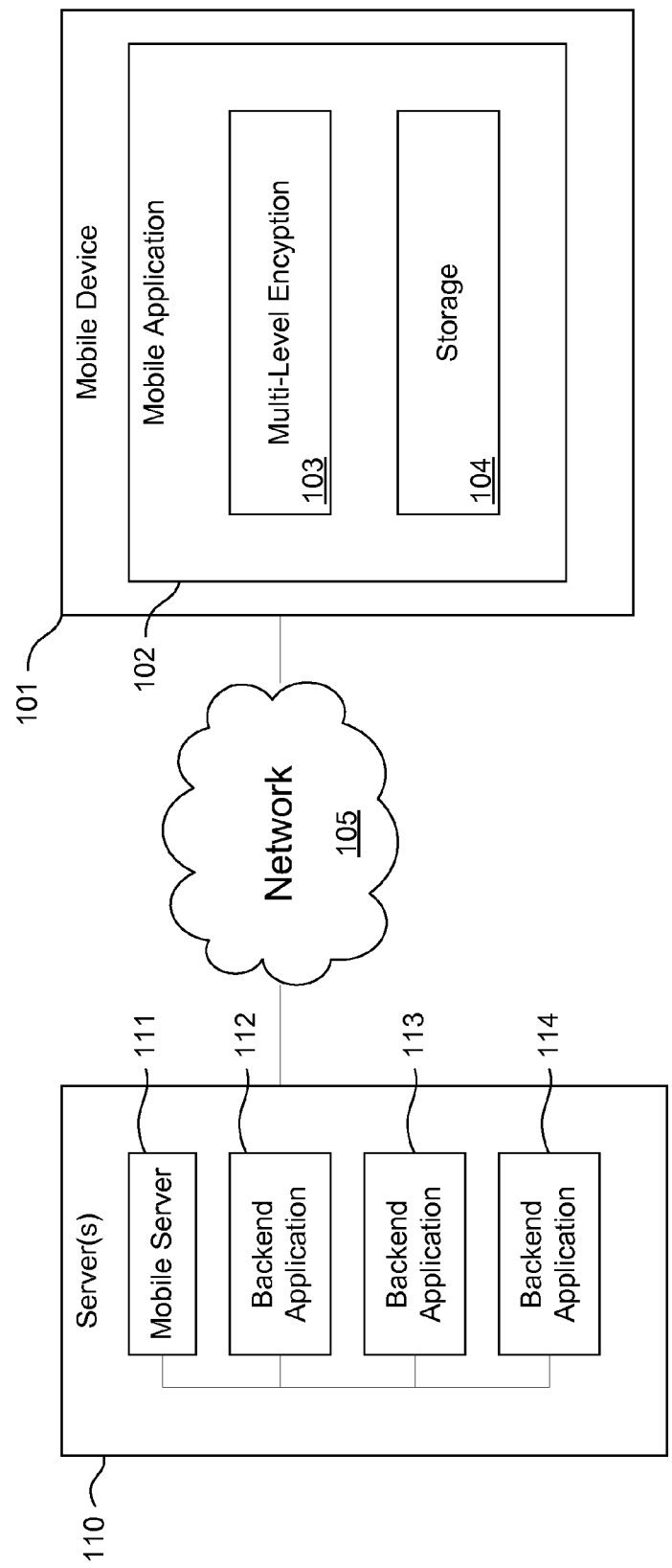
FIG. 1 illustrates secure mobile computing according to one embodiment.

FIG. 1 illustrates secure mobile computing according to one embodiment. In one embodiment, secure data storage on a mobile computing device is achieved using a multi-level encryption algorithm to enhance the security of data stored on a mobile application. As illustrated in FIG. 1, a mobile computing device 101 (or just, "mobile device") executes a mobile application 102. Mobile device 101 may be a mobile phone, such as a smartphone, or a tablet computer, for example. Such mobile devices may include one or more processors and memory for storing instructions to perform a wide variety of features and functions, including the features described herein. Mobile device 101 may connect to other remote systems such as one or more servers 110 over a network 105, for example. Network 105 is illustrative of one or more networks for communicating information with other computer systems, such as a cellular communication system, an Ethernet network, the Internet, or a wireless network, for example. Mobile application 102 executing on mobile device 101 may receive and secure data from one or more remote systems or from a user via a user interface, for example. In this example, mobile application 102 may communicate with a mobile server 111. Mobile server, in turn, may act as an interface between mobile application 102 and backend applications 112-114.

Data received in mobile application 102 may be saved in storage 104. Embodiments of this disclosure may perform multiple encryptions of data as the data is stored using multi-level encryption component 103. Mobile application 102 may implement multiple levels of security, sometimes on different portions of data, based on how security for the mobile application and the mobile device are configured, for example.

Figure 2:
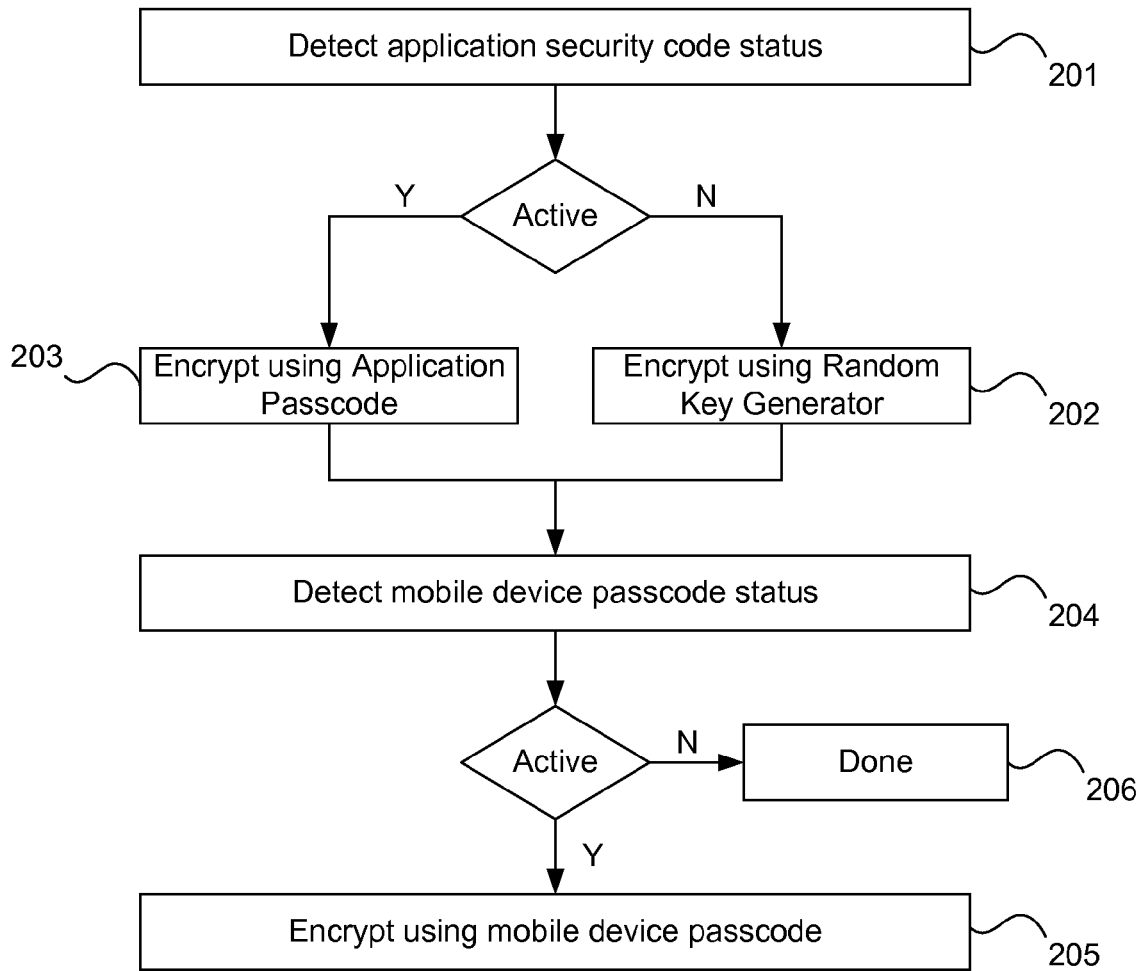
FIG. 2 illustrates an algorithm for secure storage of data on a mobile device according to one embodiment.

An algorithm for secure storage of data on a mobile device is illustrated in FIG. 2. The method of FIG. 2 is described with reference to FIG. 1. In one example embodiment, a security process may use multi-level encryption that is based on security provisions of the mobile application itself, as well as security provisions of the mobile device. For example, mobile application 102 may be configured to require an application passcode, such as a password or other unique identifier, before access to the mobile application will be permitted. Additionally, mobile device 101 may be configured to require a mobile device passcode, such as a password, before access to the mobile device will be permitted. These two passcodes may be used to double encrypt the data as described below.

For example, a mobile phone may have a mobile device passcode that may be activated or deactivated. As more mobile phone users connect their mobile devices to electronic resources offered by their employer's backend systems (e.g., email, calendars, ToDo lists, etc. . . . ), employers may force activation of the mobile device passcode feature to protect sensitive information. When a mobile device passcode is activated, the mobile device requires a user to enter a mobile device passcode (e.g., a password) to allow the user to access the features of the mobile device. In some mobile devices, the user is locked out of all, or mostly all, of the mobile device's features until the correct password is entered. The operating system of the mobile device may store the mobile device passcode status, which may be active (turned on) or inactive (turned off), for example.

Similarly, a mobile application may have an application security feature that may be activated or inactivated in an administration section of the mobile application software. Some mobile applications may interact with backend enterprise software applications operating on a cloud computing system, for example, and a system administrator may require each mobile application having access to the backend enterprise application to receive an application passcode before access to the mobile application will be granted. When the application security feature is activated, the mobile application requires a user to enter an application passcode (e.g., a password) to allow the user to access the features of the mobile application. The application running on the mobile device may store the application security status, which may be active (turned on) or inactive (turned off), for example.

In this example, the method of FIG. 2 may use the application passcode and mobile device passcode to improve security on the mobile device. When data is received by the mobile application, the follow encryption process may be performed. At 201, the application security status may be detected. For example, mobile application 102 may check its' own internal settings to determine if it has been configured to require an application passcode. If the application security status is active, then the algorithm proceeds to 203. If the application security status is inactive (i.e., no application passcode is required to access functionality mobile application 102), then the algorithm proceeds to 202. Embodiments of the present disclosure may perform a first encryption of data associated with the mobile application based on the whether or not the application security status active. For example, data may be encrypted using one encryption key when the application security status is active, and the data may be encrypted using a different encryption key when the application security status is not active. In this example, if the application security status is inactive, and the algorithm proceeds to 202, then the mobile application may encrypt the data using a key generated by a random key generator to provide a default minimum level of security for application data in storage 104. A random key generator may use a pseudorandom methodology, for example. However, if the application security status is active, and the algorithm proceeds to 203, then the mobile application may encrypt the data using a key generated from the application passcode. For example, if the mobile application determines that the application passcode is required to access the mobile application, then the mobile application may use the application passcode as a seed to generate an encryption key to encrypt the data. In one example embodiment, an application passcode may be padded with additional characters. The passcode may then be hashed to produce an encryption key. Deriving an encryption key using the application passcode, for example, may provide a higher level of security for the encrypted data. Thus, when the application security status is activated, the algorithm applies a different higher level of security to encrypt data in storage 104 than when the application security status is inactive.

After a first encryption, the algorithm may apply a second encryption. From 202 and 203, the algorithm proceeds to 204, where a mobile device passcode status is detected. For example, as mentioned above, the mobile device may allow a user to lock the device by activating a mobile device passcode feature. When the mobile device passcode status is active, the mobile device may lock a user out such that none of the features (or a very limited set of features) of the mobile device are accessible unless a user enters a mobile device passcode. When the passcode is entered, the mobile device allows the user to access the device's functionality. In some systems, the mobile device passcode status may be determined using calls to the operating system, for example.

If the mobile device passcode status is not active (i.e., not turned on), then the algorithm is finished at 206 and the encrypted data may be stored. However, if the mobile device passcode status is active, then the mobile application may perform a second encryption of the data at 205. The second encryption uses a different encryption key than the first encryption. In one example implementation, the encryption key for the second encryption may be derived from the mobile device passcode.

In one embodiment, the first encryption using an application passcode, for example, may occur in real time as the data is read to an retrieved from storage. The second encryption using a device passcode, for example, may occur when the mobile device enters an inactive mode (e.g., a screen saver mode or power down state). For example, when the mobile device enters an inactive mode, a command to the operating system may instruct the operating system to encrypt data in a particular location (e.g., a database or a file) using the device passcode. Thus, encryption of data may occur without the application accessing the device passcode. Encryption processes may use an encryption algorithm such as CCRYPT, for example, which is a utility for encrypting and decrypting files and streams. The algorithm provided by ccrypt is asymmetric, i.e., one must specify whether to encrypt or decrypt. One way to invoke ccrypt is via the commands ccencrypt and ccdecrypt. The following is one example usage of ccrypt. Other encryption techniques may also be used:

```
Usage:    ccrypt [mode] [options] [file . . . ]
          ccencrypt [options] [file . . . ]
          ccdecrypt [options] [file . . . ]
          ccat [options] file . . .
Modes:
    -e, --encrypt        encrypt
    -d, --decrypt        decrypt
    -c, --cat            cat; decrypt files to stdout
    -x, --keychange      change key
```

"Options" allow specification of where to obtain keywords for the encryption process (e.g., from a file, from an environment variable, etc. . . . ).

In one embodiment, the first encryption and the second encryption are cumulative. For instance, if both the application security status and the mobile device passcode status are active, then the data is encrypted using the first encryption, and the data is encrypted again using the second encryption (i.e., the second encryption encrypts the encrypted data from the first encryption). In this example, data access may be considered as a locked box inside a locked box, where the mobile device passcode is required to enter the first locked box, and the application passcode is required to enter the second locked box to access the data.

Some embodiments may allow different data to be encoded in different ways. For example, data encryption and decryption can be computationally intensive and time consuming. It may be advantageous to encrypt some data and not encrypt other data, or to encrypt data differently depending on how sensitive the data is. In one embodiment, the mobile application framework allows data to be classified and associated with different encryption schemes. For instance, it may be desirable to encrypt particular data with both the first and second encryption, but for other data it may be desirable to only perform one of the encryptions. Some embodiments of mobile application 102 may specify data that is to be encrypted by both the first and second encryptions, and other data may not receive both levels of encryption. In particular, some configuration data and data pertaining to the look and feel of how some items are displayed, for example, may not receive both the first and second encryption. Other data, forming a subset of the data stored in the mobile application storage 104, may receive both the first and second encryption. Accordingly, a predefined subset of stored data may receive the first encryption, while data outside the subset of stored data may not receive the first encryption. On the other hand, in one embodiment, the second encryption (e.g., using the mobile device passcode) may be performed on all the stored data in mobile application storage 104. This technique may be advantageous in optimizing security against computing power of the mobile device 101. Mobile application developers may specify more data to receive both encryptions when more powerful resources are available, or computational loading may be reduced in other applications by reducing the data set to receive both encryptions, for example.

Figure 3:
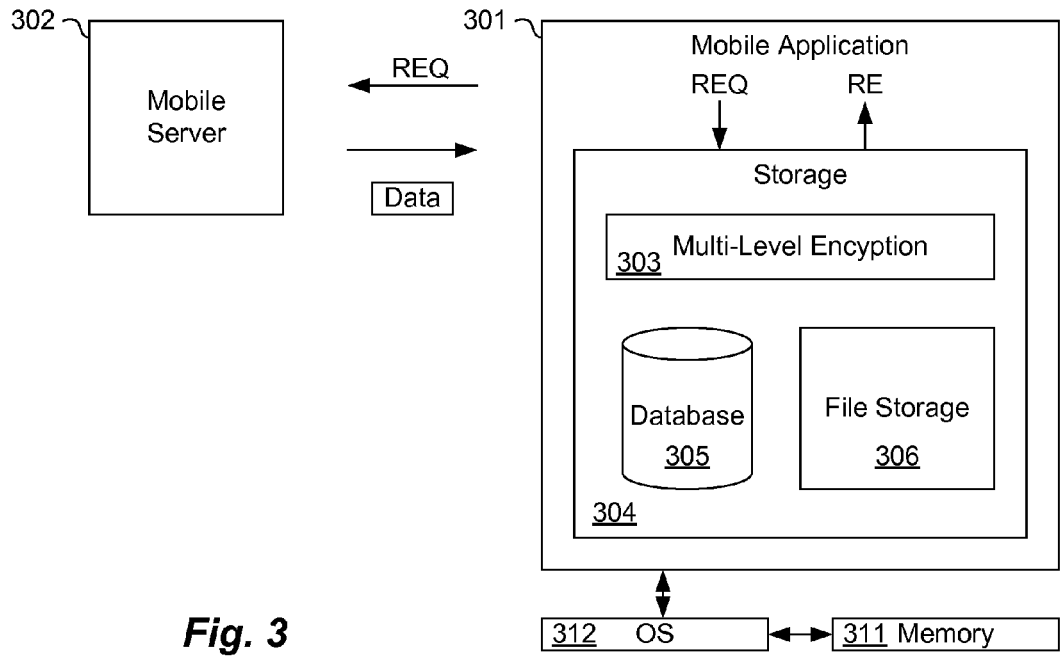
FIG. 3 illustrates a mobile computing arrangement according to another embodiment.
Figure 4:
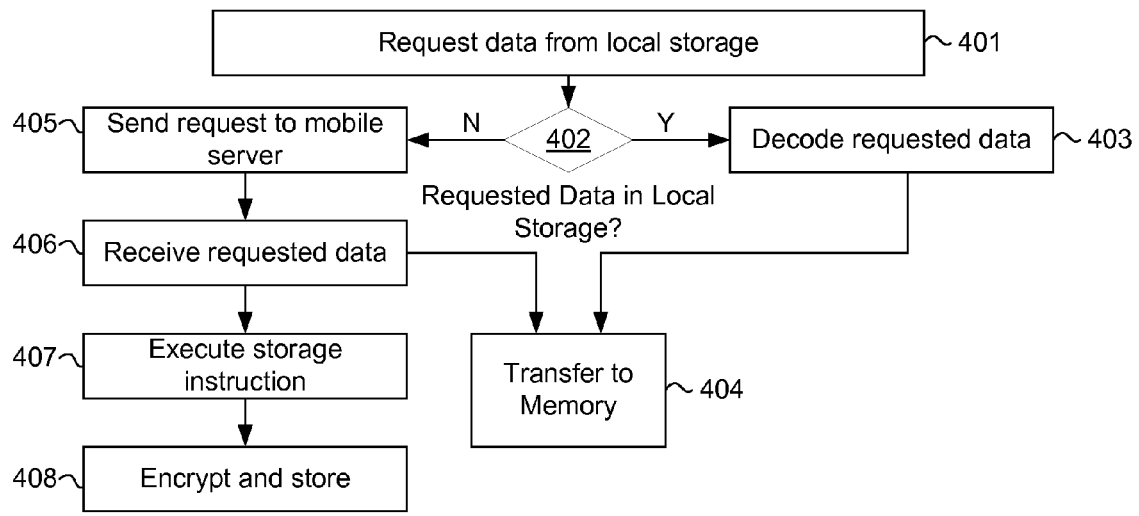
FIG. 4 illustrates another algorithm for secure storage of data on a mobile device according to one embodiment.

FIGS. 3-4 illustrate further aspects of multi-level encryption according to some embodiments. In some applications, it may be desirable to provide offline capabilities to a mobile device. For instance, to display information available from remote sources, it may be necessary to cache the information locally so the mobile application can access such information when no network connectivity is available. This example illustrates an algorithm performed when a mobile application 301 requests data. When data is requested by an action taken on mobile application 301, the application may first check for the requested data in local storage 304. For example, while some data may typically reside externally on a remote system, the requested data may have been previously accessed and cached in local storage 304. Accordingly, a data request (REQ) is sent to storage 304 before being sent to an external system, such as mobile server 302.

In this example, a multi-level encryption component is integrated into the storage component 304 of application 304 so that storage and encryption may be performed in a single step. In other words, the storage component and encryption functions may be part of a common framework, for example. Data retrieval on mobile application 301 is described with reference to the algorithm shown in FIG. 4. At 401, a data request (REQ) is received by storage 304 and a query may be generated for data specified in the request. In this example, storage 304 includes a database 305 and a file storage system 306. Database 305 may store data as one or more tables, and file storage 306 may store entire files such as images, modules, or formatted documents, for example. As mentioned above, database 305 and file storage 306 may be accessible only by (or through) the mobile application 301. If the requested data is available at 402, then encrypted data is retrieved and decoded at 403 using multi-level encryption component 303. Mobile application 301 may transfer the requested data to application memory 311 at 404 using a call to the operating system 312, for example.

If mobile application 301 determines that the requested data is not in local storage 304, then the algorithm branches at 402 and sends data request (REQ) to mobile server 302, for example. Mobile server 302 may interact with multiple other backend application servers or database servers to retrieve the requested data. Mobile server 302 may be included as part of a cloud computing infrastructure to tie the features of mobile application 301 together with features of one or more backend systems. Data retrieved from mobile server 302 is received by mobile application 301 at 406. The retrieved data may be transferred to memory 311 for use by the application at 404 as described above.

In one embodiment, the retrieved data may be cached in storage 304 for later use. For example, one embodiment of the framework may automatically encrypt and store the requested data in response to the instruction at 407. When data is retrieved and stored, the data may be associated with an indication that encryption is to be applied. For example, a storage instruction may include a flag indicating that the item to be stored should be encrypted. When the framework receives the item to be stored, the flag may be checked. If encryption is to be performed, then the appropriate encryption keys may be generated (e.g., by retrieving, padding, and hashing an application passcode), and the item is automatically encrypted and stored at 408.

Example Hardware

Figure 5:
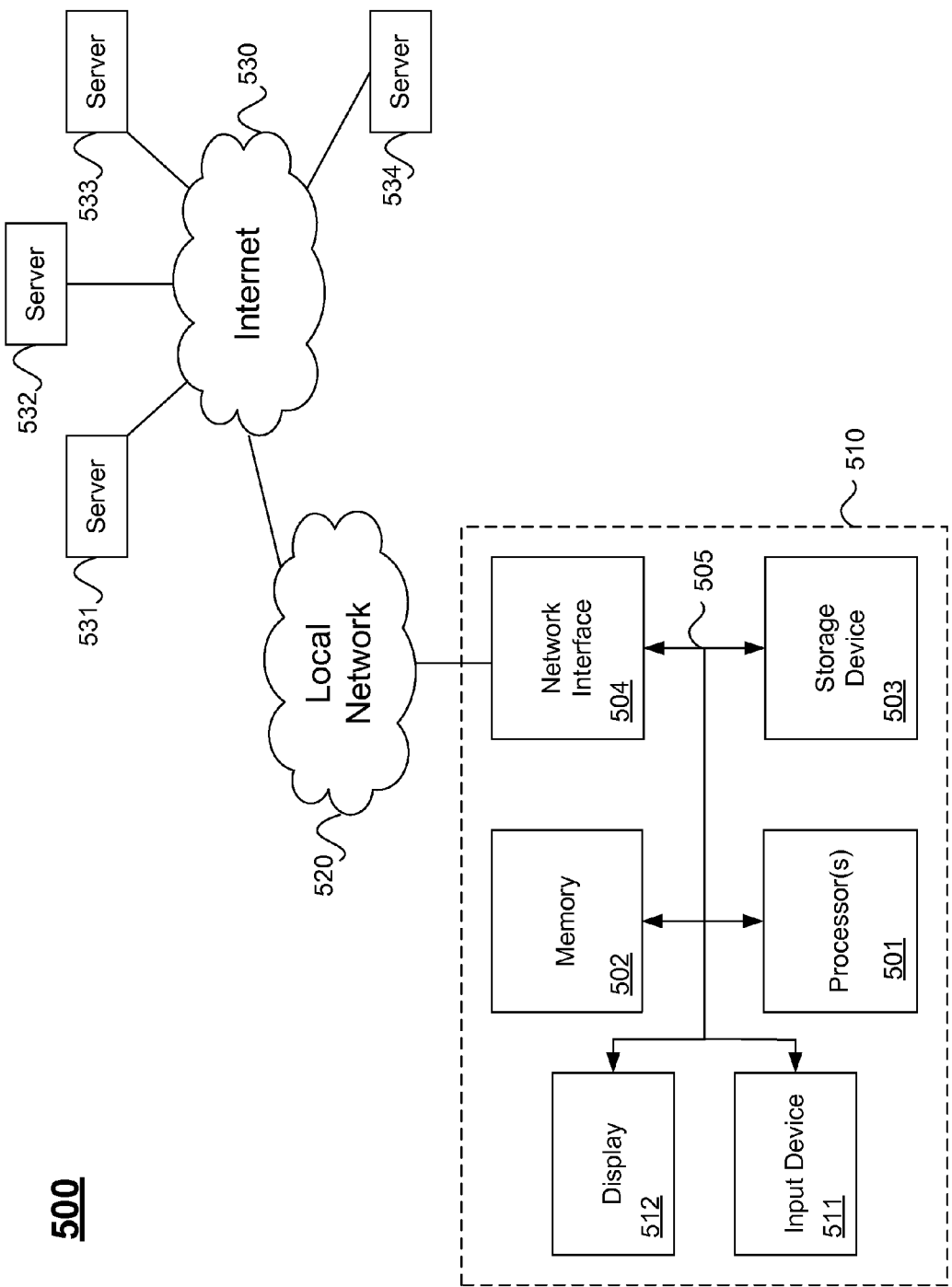
FIG. 5 illustrates hardware of a special purpose computing machine configured with a process according to one embodiment of the present invention.

FIG. 5 illustrates hardware of a special purpose computing machine configured with a process according to the above disclosure. The following hardware description is merely one example. It is to be understood that a variety of computers topologies may be used to implement the above described techniques. An example mobile computer system 510 is illustrated in FIG. 5. Mobile computer system 510 includes a bus 505 or other communication mechanism for communicating information, and one or more processor(s) 501 coupled with bus 505 for processing information. Mobile computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

Mobile computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

Mobile computer system 510 also includes a network interface 504 coupled with bus 505. Network interface 504 may provide two-way data communication between computer system 510 and a local network 520. The network interface 504 may be a wireless or wired connection, for example. Mobile computer system 510 can send and receive information through the network interface 504 across a local area network, an Intranet, a cellular network, or the Internet, for example. One example implementation may include a mobile application executing on a mobile computing system 510 that receives, encrypts, and stores data as described above. In the Internet example, a mobile application may access data on backend systems that may reside on multiple different hardware servers 531-535 across the network. Servers 531-535 may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   detecting, on a mobile computing device, an application security status, wherein when the application security status is active an application passcode is required to access functionality of a mobile application operating on the mobile computing device;
   performing, on the mobile computing device, a first encryption of data associated with the mobile application, wherein the first encryption uses a first encryption key when the application security status is active, and wherein the first encryption uses a second encryption key when the application security status is not active;
   detecting, on the mobile computing device, a mobile device passcode status, wherein when the mobile device passcode status is active a mobile device passcode is required to access functionality of the mobile computing device; and
   performing, on the mobile computing device, a second encryption of the data when the mobile device passcode status is active, wherein the second encryption uses a third encryption key.

2. The method of claim 1 wherein the first encryption key is derived from the application passcode.

3. The method of claim 1 wherein the second encryption key is a randomly generated key produced by the mobile application.

4. The method of claim 1 wherein the third encryption key is derived from the mobile passcode.

5. The method of claim 1 further comprising storing the encrypted data in a storage location that is accessible only by the mobile application.

6. The method of claim 1 wherein the first encryption produces encrypted data and the second encryption encrypts the encrypted data.

7. The method of claim 1 wherein the mobile application stores a plurality of data in a storage system accessible only by the mobile application, and wherein said first encryption is performed on a predefined subset of the plurality of data in the storage system, and wherein the second encryption is performed on the plurality of data in the storage system.

8. The method of claim 1 further comprising:
   sending, by the mobile application, a request for data to a remote server;
   receiving, by the mobile application, requested data;
   performing, by the mobile application, an instruction to store the requested data with a flag indicating the requested data is to be encrypted; and
   automatically encrypting and storing the requested data in response to the instruction.

9. A mobile computing device comprising:
   a processor; and
   a non-transitory computer readable medium having stored thereon one or more programs, which when executed by the processor, causes the processor to:
   detect an application security status, wherein when the application security status is active an application passcode is required to access functionality of a mobile application operating on the mobile computing device;
   perform a first encryption of data associated with the mobile application, wherein the first encryption uses a first encryption key when the application security status is active, and wherein the first encryption uses a second encryption key when the application security status is not active;
   detect a mobile device passcode status, wherein when the mobile device passcode status is active a mobile device passcode is required to access functionality of the mobile computing device; and
   perform a second encryption of the data when the mobile device passcode status is active, wherein the second encryption uses a third encryption key.

10. The mobile computing device of claim 9 wherein the first encryption key is derived from the application passcode.

11. The mobile computing device of claim 9 wherein the second encryption key is a randomly generated key produced by the mobile application.

12. The mobile computing device of claim 9 wherein the third encryption key is derived from the mobile passcode.

13. The mobile computing device of claim 9 wherein the first encryption produces encrypted data and the second encryption encrypts the encrypted data.

14. The mobile computing device of claim 9 wherein the mobile application stores a plurality of data in a storage system accessible only by the mobile application, and wherein said first encryption is performed on a predefined subset of the plurality of data in the storage system, and wherein the second encryption is performed on the plurality of data in the storage system.

15. A non-transitory computer readable storage medium storing one or more programs, the one or more programs comprising instructions for:
   detecting an application security status, wherein when the application security status is active an application passcode is required to access functionality of a mobile application operating on a mobile computing device;
   performing a first encryption of data associated with the mobile application, wherein the first encryption uses a first encryption key when the application security status is active, and wherein the first encryption uses a second encryption key when the application security status is not active;
   detecting a mobile device passcode status, wherein when the mobile device passcode status is active a mobile device passcode is required to access functionality of the mobile computing device; and
   performing a second encryption of the data when the mobile device passcode status is active, wherein the second encryption uses a third encryption key.

16. The non-transitory computer readable storage medium of claim 15 wherein the first encryption key is derived from the application passcode.

17. The non-transitory computer readable storage medium of claim 15 wherein the second encryption key is a randomly generated key produced by the mobile application.

18. The non-transitory computer readable storage medium of claim 15 wherein the third encryption key is derived from the mobile passcode.

19. The non-transitory computer readable storage medium of claim 15 wherein the first encryption produces encrypted data and the second encryption encrypts the encrypted data.

20. The non-transitory computer readable storage medium of claim 15 wherein the mobile application stores a plurality of data in a storage system accessible only by the mobile application, and wherein said first encryption is performed on a predefined subset of the plurality of data in the storage system, and wherein the second encryption is performed on the plurality of data in the storage system.

* * * * *